United States Patent [19]

Bellina

[11] 4,416,433

[45] Nov. 22, 1983

[54] SIGNAL BALLOON DISPENSING APPARATUS

[76] Inventor: Joseph H. Bellina, 3949 Kabel Dr., New Orleans, La. 70114

[21] Appl. No.: 282,809

[22] Filed: Jul. 13, 1981

[51] Int. Cl.³ .......................... B64B 1/50; H04B 1/04
[52] U.S. Cl. ...................................... 244/33; 116/210
[58] Field of Search ................ 244/31, 33, 98, 153 R, 244/155 R, 155 A; 116/210, DIG. 9, DIG. 8, 209; 441/30, 25; 343/706; 46/90, 88, 87

[56] References Cited

U.S. PATENT DOCUMENTS

| | | | |
|---|---|---|---|
| 3,132,626 | 5/1964 | Reid | 116/210 |
| 3,229,517 | 1/1966 | Smith | 244/33 |
| 3,526,202 | 9/1970 | Graulich et al. | 441/30 |
| 3,746,285 | 7/1973 | Mango | 114/210 |
| 4,042,882 | 8/1977 | Camacho et al. | 116/210 |
| 4,108,405 | 8/1978 | Gibson | 244/33 UX |
| 4,295,438 | 10/1981 | Porter | 116/210 |

Primary Examiner—Galen L. Barefoot
Attorney, Agent, or Firm—Charles C. Garvey, Jr.

[57] ABSTRACT

A self-contained signal balloon dispensing apparatus provides a lower case having a bottom and attaches to enclosing side walls with an open top. An upper lid assembly hingedly affixes to the lower case at the open top, the lid assembly providing at least a pair of half enclosure sections, at least one of which provides a horizontal partition when in a closed position to at least partially seal the open top. A vertical partition is mounted within the lower case and divides the lower case into two parts. A shaft is mounted within the lower case and attaches at one end portion to the partition and at the opposite end portion to the side wall. A dispensing spool wound with a length of tether line is rotatably mounted on the shaft. A helium gas dispensing canister is mounted in the lower case on the opposite side of the partition from the spool. An inflatable balloon is mounted within the case and connects to the canister. A trigger includes a gripping surface extend exteriorly of the lower case for actuating the canister to dispense helium into the balloon. A signaling light source normally carried in one of the lid assembly half enclosure section attaches to the balloon and to one end of the tether line. A horizontal baffle adjacent a portion of the open end of the lower case above the canister supports the light source and separates it from both the helium canister and the dispensing spool so that when the balloon is inflated, it is free to ascend without interference from light source, the spool, or the canister.

10 Claims, 7 Drawing Figures

SIGNAL BALLOON DISPENSING APPARATUS

BACKGROUND OF THE INVENTION

1. Technical Field

The present invention relates to signal devices such as signal balloons, and signaling devices elevated by signaling balloons and the like. The present invention more particularly relates to an improved signaling device utilizing an inflatable balloon and signaling light assembly which can be elevated responsive to inflation of the balloon with a lighter-than-air gas such as helium.

2. General Background

Several devices have attempted to solve the problem of allowing an individual who is lost or in need of help to be identified. Such devices are generally intended for locating persons such as lost travelers in densely wooded areas or isolated areas, or the like in which locating the individuals by conventional means would be impossible or so time consuming as to pose a danger to the individuals.

Many times hunters, sportsmen, and the like are lost and are not located due to the remoteness or denseness of the region in which they are located. This problem is compounded when the individual might be injured or suffering from exposure or fatigue. Weather conditions, fires, and other complications of this type can make it even more difficult to locate persons lost in heavily wooded or remote areas.

Several devices have been patented which have attempted to solve the problem of providing a signaling device or survival apparatus which is easily transported, portable, self-contained, and of utility in the signaling of a position of an individual who might be lost, injured or otherwise in distress.

In U.S. Pat. No. 3,964,427 a Survival Apparatus provides a balloon in a bottle of pressurized helium which is secured by a cord and fed through an indicator as it is being released to show the amount of cord that has been released and thereby the height of the balloon.

A "Signal Buoy Balloon" is seen in U.S. Pat. No. 2,619,303 having a bulb for illuminating the balloon itself, the bulb being battery powered and the entire assembly being lifted by a lighter-than-air product and secured by means of a tether line.

In U.S. Pat. No. 2,629,115 there is provided a "Life Raft" which discloses a reel, a length of tether line secured to the reel, and at the opposite end portion thereof a signaling balloon.

An "Emergency Signal Assembly" provides a carrier for attachment to a signal balloon preferably of luminescent, International orange color in which the balloon when inflated with such a gas as helium, hydrogen or the like will suspend the carrier, and in which the carrier includes a gas reservoir communicatable with a discharge nozzle to which the balloon is sealingly connected and in which a manually operable firing pin in engageable with a frangible seal, of the reservoir and in which an electrically operated supplemental signal assembly is controlled by an operating cord beneath the assembly when aloft whereby a repetitive signal can be transmitted.

A "Survival Kit" is seen in U.S. Pat. No. 3,951,260 which is in the form of a backpack containing therewithin a collapsible inflatable balloon which may be inflated by a lighter-than-air gas. Also provided within the packback are a number of baffles dividing the backpack into compartments with the compartments housing additionally a pressurized container of the lighter-than-air gas and a winding member having would thereabout a length of flexible tether line. The balloon would be of a color which is readily viewable from a distance.

In U.S. Pat. No. 3,746,285 there is provided a "Rescue Balloon Kit" having a folded inflatable balloon secured in fixed position in a box having a hinged cover with snap-type latches. The balloon has a long neck and contains a tubular container carrying a lighter-than-air gas cartridge having a frangible end and spring biased cartridge puncturing means which are held in biased position by a latch lever which extends outward from the container inside the neck. A pivoted trigger lever extends along the outer surface of the box and has an enlarged inner end adapted to depress the latch lever when the outer end is swung away from the box filling the balloon, opening the cover, and releasing the balloon. A light line, secured to the container, is wound on a reel in the box for tethering the balloon.

U.S. Pat. No. 3,310,024 shows a "Signal Balloon" being tethered by means of a reel and tether line with there also being provided a cannister of lighter-than-air gas for inflating the balloon.

In U.S. Pat. No. 3,002,490 there is seen a "Survival Kit" having a reel of dispensing line mounted within a container with an opening in the container allowing the line to pass therethrough. An inflatable balloon is provided as well as a gas cannister for filling the balloon.

In U.S. Pat. No. 3,721,983 a "Signal Balloon" is provided for use by hunters, boatsmen and the like to attract searchers when the hunter or boatsman is lost or in distress. A brightly colored translucent balloon containing radar reflective material is attached to a cannister containing a battery and bulb for illuminating the balloon from inside and is formed with a charging chamber to receive a cylinder of helium and operating through a valve by which the balloon may be inflated. A line is attached to the casing for holding or anchoring the inflated balloon.

A "Visual and Radar Emergency Detection Balloon" is the subject of U.S. Pat. No. 4,120,259. In that patent, there is seen a kit containing an inflatable balloon, a length of tethering cord attached to the balloon harness and a container of gas for inflating the balloon. The harness is formed of four shaped flat cards, each joined by flat elastic band to a cross-piece bracket externally mounted about the top of the balloon, each elastic band extends to a card mounted about a lower quadrant of the balloon, with each card held in a plane substantially perpendicular to the two adjacent cards. The balloon and cards are externally covered with a coating that reflects both light and radar waves. The elasticity of the bands enables the balloon to uniformly expand as it rises, and the cards to extend the plane of visual and radar reflection.

3. General Discussion of the Present Invention

Many of these devices above-mentioned are highly complex and require extensive assembly prior to operation.

The present invention, however, provides a signalling unit which can carry a strobe unit aloft for easy identification by ranger towers, towns, cities or observation by airplane. The device provides a cord which goes directly to the injured or isolated individual. An International orange color could be used if desired for ease of location. The apparatus of the present invention could be carried by individuals, in small craft at sea, and could be rapidly deployed thus increasing the chances of survival and location. The apparatus provides a hinged box which can be externally activated and provide an expandable balloon inflated with a lighter-than-air material such as helium or the like. The signal balloon when inflated would ascend aloft carrying with it a strobe unit carried on a short halyard and supplied with a battery and/or photoelectric cell for energy. The strobe unit housing could have a series of silicone disks which would be activated by sunlight. The silicone disk solar cells would charge an internal electrical circuit attached to a nickel cadmium battery or the like to allow for nighttime activation of the strobe unit. A photo detector could be provided on the housing which would tell the circuitry when the sunlight was below a critical level and activate the strobe unit. During sunlight, the same cell would deactivate the circuitry and allow for a recycling to begin. A small electronic circuit breaker utilizing a pressure plate could be used to turn off the entire circuitry while encased within the provided plastic or like housing which would be worn by the user. A spool of tether line material would be mounted within the case and would allow the signal balloon and strobe unit assembly to be carried to a desired position of elevation. The spool could have an associated brake button attached to the outer case allowing the operator to depress the reel using the button and thus frictionally contact it and slow the ascent of the balloon if necessary to guide it through obstructions such as tree cover. A replaceable helium cartridge would be provided within the unit for inflating the balloon.

The case would include a hinged top section having a temporary closure. Removal of the closure would allow egress of the inflated balloon responsive to inflation with the inflation of the balloon urging the hinges to open automatically. A valving device communicating between the cylinder of helium and the balloon would be detonatable from a position exterior to the case with the entire unit being assembled within the case prior to use, thus requiring no assembly by the operator.

The case provides a lower case section having a bottom and connecting side walls. An upper case would be hingedly attached to the lower case section and would provide at least one horizontal baffle section for retaining thereupon a strobe light to be elevated. A partition could be provided within the lower section with a shaft mounted within the lower section and attached at its end portions to the partition and to a side wall. Opposite the partition from the reel could be provided a helium dispensing cartridge downwardly depending with its lower tip being connected to a valving member. An actuator would extend from the valving member through the side wall to an external knob providing a means for externally activating the device. A conduit would communicate with the valving member at one end portion and at its opposite end portion connect to a signaling balloon which would be deflated prior to actuation. A pressure releasing check valve would be affixed to the balloon at its connection to the conduit thus providing a means for forming a seal once the balloon were completely inflated.

The above apparatus as described would thus be very self-contained, easily portable, and totally assembled for operation requiring no additional assembly by the user. The device would be manually operable from exterior to the case with actuation by an external actuator thus causing the balloon to immediately inflate carrying with it as it ascends the signal light. The tether line wound about the spool would attach to the strobe light with the light and balloon being assembled by suitable means such as a short halyard. The innermost end portion of the spool would provide an attachment of the spool to the tether line disallowing a complete loss of the balloon and strobe light assembly.

It is thus an object of the present invention to provide a self-contained signaling apparatus which it actuatable by the user external to the case and without assembly of the various components.

It is another object of the present invention to provide a signaling apparatus which is swift, easy and simple to use.

It is another object of the present invention to provide a signaling apparatus which is easy to construct and very compact.

Another object of the present invention is to provide a signaling apparatus which is self-dispensing upon actuation by the user.

Another object of the present invention is to provide a signaling apparatus which inflates the balloon responsive to external actuation by the operator and automatically seals the balloon and allows it to dispense from the case and ascend without additional manual steps by the operator after actuation.

BRIEF DESCRIPTION OF THE DRAWINGS

For a further understanding of the nature and objects of the present invention, reference should be had to the following detailed description, taken in conjunction with the accompanying drawings, in which like parts are given like reference numerals and wherein.

BEST MODE FOR CARRYING OUT THE INVENTION

Figures 1, 2, 3, 4:
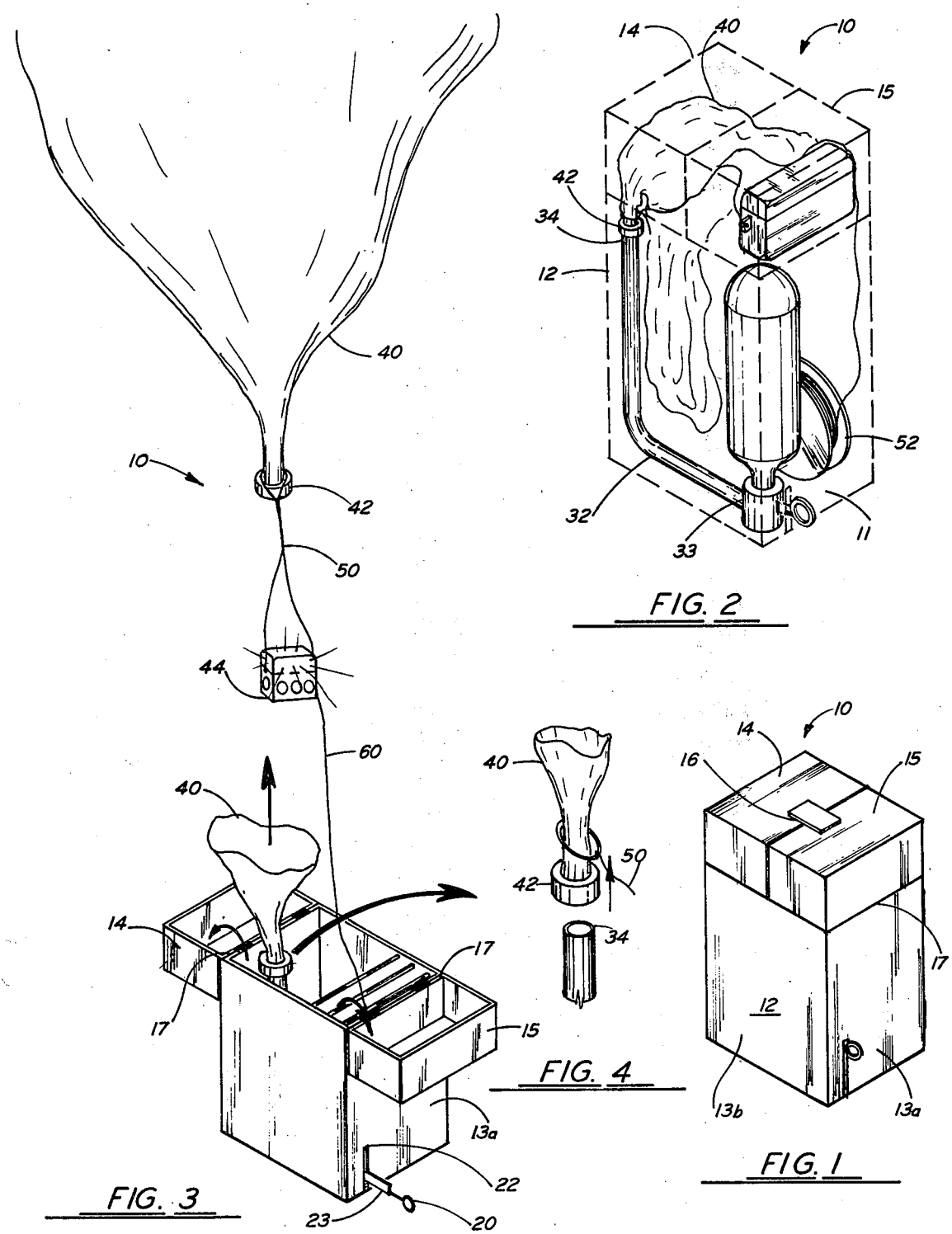
FIG. 1 is a perspective view of the preferred embodiment of the apparatus of the present invention.
FIG. 2 is a perspective view of the preferred embodiment of the apparatus of the present invention with the outer case in phantom lines.
FIG. 3 is an exploded view of the preferred embodiment of the apparatus of the present invention at actuation.
FIG. 4 is a perspective view of the preferred embodiment of the apparatus of the present invention illustrating the conduit-balloon connection.

FIG. 1 shows generally the preferred embodiment of the apparatus of the present invention designated generally by the numeral 10.

In FIG. 1, there can be seen an enclosure comprising a lower case 12 and an upper case represented generally by the numerals 14, 15, with each numeral 14, 15, designating respectively a pair of substantially identical lid halves. Lid halves 14, 15 would be hingedly connected at 17 to lower case 12. A suitable temporary closure strip 16 as, for example, a Velcro type fastener would be removed by the operator coincident with actuation of the device. FIG. 3 shows one or more bars forming a horizontal baffle crossing the case opening to support the signal light 44 before actuation of the device. A partition 18 would be provided within lower case 12, dividing lower case 12 into sections with one side of partition 18 providing a place for the attachment of shaft 19 thereto with the opposite end of shaft 19 affixing to side wall 13d. Side walls 13a–13d as best seen in FIG. 4 connect at their lowermost edges to a provided bottom 11 with the preferred embodiment providing a substantially cubical or rectangular case 10.

An elongated vertical slot 22 provides a place for the outcrop of lever 23 with an attached knob 20. Knob 20 would be pulled outwardly away from wall 13a as shown by the curved arrow in FIG. 3 in order to activate the device as will be described more fully hereinafter. Lever 23 would attach to valving member 25 which could be any suitable dispensing valve actuatable by a lever and by pivotal motion of the lever as an example. Such valves 25 are commercially available, and commonly used in combination with pressurized cannisters/cartridges in the controlled dispensing of gas therefrom as when inflating balloons, for example.

A cylinder or cannister cartridge 30 of lighter-than-air gas such as helium, hydrogen or the like would attach at its lower end portion to valving member 25 and would dispense responsive to the actuation of valving member 25 by lever 23 a lighter-than-air product through valving member 25 to conduit 32. Conduit 32 as best seen in FIG. 2 attaches to valving member 25 at end portion 33 and at its opposite end portion 34 attached to an initially collapsed inflatable balloon 40. The connection of balloon 40 to conduit 32 at 34 provides a pressure releasing check valve 42 which would allow for sealing of balloon 40 responsive to inflation.

A signal light 44 preferably a strobe light or the like comprises a light body 45 and clear lens 48 portion affixed thereto. Eyelets (not shown) would be provided on body 45 for attachment respectively by means of a halyard 50 to balloon 40 and likewise eyelets or the like could be provided on body 45 for attaching tether line 60 thereto. Tether line 60 would be wound about spool 52 which would be mounted upon shaft 19. The end portion of line 60 opposite its connection to strobe light 44 would be affixed firmly to the spool 52 to anchor the balloon and light assembly upon ascension to a desired elevated height.

Figure 5:
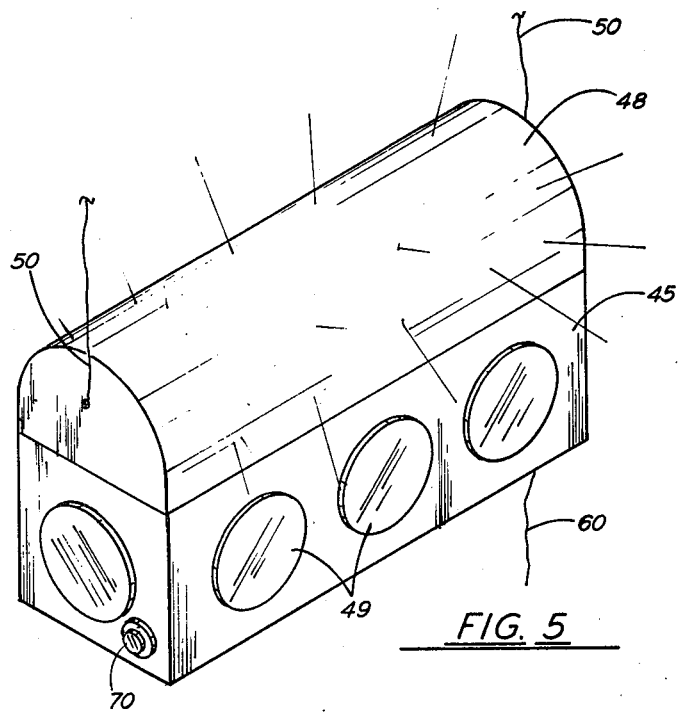
FIG. 5 is a perspective view of the strobe light portion of the preferred embodiment of the apparatus of the present invention.
Figure 7:
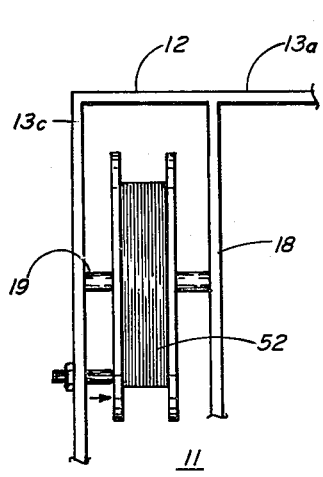
FIG. 7 is a fragmentary top view of the preferred embodiment of the apparatus of the present invention illustrating the spool and brake button portions thereof.
Figure 6:
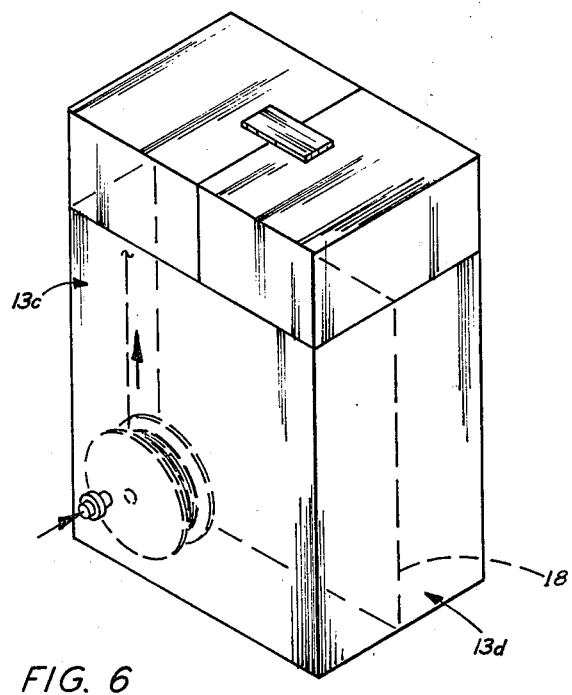
FIG. 6 is a partial perspective view of the preferred embodiment of the apparatus of the present invention with the spool and brake portions thereof shown in phantom lines.

Cartridge 30 would be, for example, a small (38-gram, eg.) helium cartridge while strobe light 44 could be any suitable signaling light operable by batteries, photoelectric cells, or other suitable power source. Light 44 would prefably be a strobe type unit having a series of silicone photoelectric disk cells which would be activated by sunlight. These photoelectric cells would charge an internal electronic circuit nickel cadmium battery to allow for nighttime activation of the strobe unit. In FIG. 5, the photoelectric silicone solar cells are designated by the numeral 49. Photo detector 70 on housing 45 would be used to interface with provided electronic circuitry when the sunlight was below a critical level and thus activate the strobe. Thus, the life expectancy of the strobe unit could be measured in months rather than terms of the life expectancy of a single battery. In addition to this, a small electronic circuit breaker utilizing a pressure plate would be used to turn off the entire circuitry while enclosed in the case 12 while being worn by the carrier. Inflatable balloon 40 would be of a desirably bright color such as International orange or the like.

Line 60 would be of a length to allow the assembly of balloon 40 and light 44 to an elevation which would allow it to be located by search planes, search parties, other individuals, or the like such as, for example, an elevation of 300 feet or more. Balloon 40 would be expandable to a size which would provide enough buoyancy to lift strobe light 44. An example would be a balloon of about a 24-inch diameter. Line 60 would be preferably of a strength which would keep it from breaking yet at the same time be light enough not to weight down the entire assembly. A thirty pound monofilament cord would be exemplary as useful for line 60.

Lower case 12 as well as lid halves 14, 15 would be of any light yet durable material such as plastic or the like which would be resistant to breakage.

As above described, the entire assembly 10 could be of a relatively small size of, for example, a height of eight inches and of a cross-sectional size of, for example, four inches by two and one-half inches.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A self-contained signal balloon dispensing apparatus comprises:
   a. a lower case having a bottom and attached to enclosing side walls with an open top;
   b. an upper lid assembly hingedly affixed to the lower case, at the open top, the lid assembly providing at least a pair of half enclosure sections, at least one of which provides a horizontal partition when in a closed position to at least partially seal the open top;
   c. a vertical partition mounted within said lower case and dividing said lower case into two parts;
   d. a shaft mounted within said lower case and attached at one end portion to said partition and at the opposite end portion to said side wall;
   e. a dispensing spool wound with a length of tether line, rotatably mounted on the shaft;
   f. a helium gas dispensing canister mounted in the lower case on the opposite side of the partition from the spool;
   g. an inflatable balloon mounted within the case and connected to the canister;
   h. trigger means including a gripping surface extending exteriorly of the lower case for actuating the canister to dispense helium into the balloon;
   i. a signaling light source normally carried in one of the lid assembly half enclosure sections and attached to the balloon and to one end of the tether line, a horizontal baffle adjacent a portion of the open end of the lower case above the canister supports the light source and separates it from both the helium canister and the dispensing spool so that when the balloon is inflated, it is free to ascend without interference from light source, the spool, or the canister.

2. The apparatus of claim 1 wherein there is further provided brake button means for frictionally breaking the rotational speed of said dispensing spool during dispensing of said tether line therefrom.

3. The apparatus of claim 1 further comprising pressure responsive check valve means attached to said inflatable balloon for sealing said balloon responsive to the inflation thereof.

4. The apparatus of claim 1 wherein said case is a rectangular prism in shape and said dispensing spool, said canister, said signaling light source are all contained within said case prior to inflation of said balloon.

5. The apparatus of claim 1 wherein said trigger means is a lever attached at one end portion to said valve and penetrating the wall portion of said case, providing a knob external of said case.

6. The apparatus of claim 1 wherein said signaling light is a strobe light.

7. The apparatus of claim 1 wherein said signaling light is provided with a plurality of photoelectric silicone solar cells for storing energy used to power said light.

8. The apparatus of claim 1 wherein there is further provided a halyard connecting said signalling light source to said balloon.

9. The apparatus of claim 2 wherein the brake button is mounted on one of said side walls outcropping externally thereof and adjacent the spool with the button providing an inner frictional surface positioned to bear and slide against the spool responsive to externally applied pressure on the button.

10. The apparatus of claim 1 wherein said canister is an elongated cylindrical canister mounted generally vertically within said case, and further including a conduit attached to the canister at the lowermost portion of the canister adjacent the bottom of the case, and said conduit means is an elongated length of tubing connected at one end portion to said valving member and at its other end portion to a provided opening on said balloon with the connection of said conduit means to said balloon being adjacent the case open top.

* * * * *